June 17, 1958

M. A. VELA 2,839,411

PROCESS AND APPARATUS FOR THE PURIFICATION OF CRYSTALS

Filed Oct. 26, 1955

INVENTOR.
M. A. VELA
BY
Hudson and Young
ATTORNEYS

United States Patent Office 2,839,411
Patented June 17, 1958

2,839,411

PROCESS AND APPARATUS FOR THE PURIFICATION OF CRYSTALS

Macedonio A. Vela, Dewey, Okla., assignor to Phillips Petroleum Company, a corporation of Delaware Application October 26, 1955, Serial No. 542,378

16 Claims. (Cl. 99—205)

This invention relates to the separation and purification of components from liquid multi-component mixtures. In one aspect this invention relates to a process for the purification of crystals. In another aspect this invention relates to apparatus for the purification of crystals.

Purification by means of fractional crystallization has been known for a number of years. Schmidt Re. 23,810 (1954) discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of nonaqueous mixtures, an example of such an application being the separation of para-xylene from a mixture thereof with the other xylene isomers and ethyl benzene.

The present invention provides a process and an apparatus for effecting a separation of the type described at higher throughput rates, improved stability and ease of operation, and improved heat distribution. In addition, products of high purity are obtainable over long periods of operation.

When practicing a fractional crystallization process as described hereinabove, the high purity of product obtainable is believed to be due at least in part to the action of the reflux stream in contacting the crystals. It is believed that the reflux stream refreezes upon the crystals moving toward the melting zone, thereby displacing occluded impurities. A stream comprising displaced impurities is thereafter removed from the column upstream, with respect to crystal movement, of the melting zone. In order to effect a high degree of purification, it is important that all of the crystals be contacted with the reflux stream prior to entering the melting zone.

The refreezing of the reflux stream upon the crystals so as to displace occluded impurities is believed to occur in a comparatively narrow zone adjacent the melting zone. In certain isolated instances, the warm end of the crystal bed may become so dense as a result of the refreezing of the reflux stream as to cause plugging of the column. This undesirable result is more liable to occur when operating the column so as to obtain an extremely high degree of purification. Thus, in order to obtain a high degree of purification, it becomes necessary to increase the amount of liquid passed as a reflux stream into the moving mass of crystals, and the higher the desired purity of the product the denser the warm end of the crystal bed becomes and the more difficult it is to force the reflux liquid required up through the crystal bed.

The reflux stream in refreezing upon the crystals gives up heat which raises the temperature of the crystals in the warm end of the crystal bed. This is the major source of heat for raising the temperature of the crystals to their melting point. As the difference between the crystal inlet temperature and the crystal melting point increases, it becomes necessary to increase the amount of reflux liquid in order to supply the required amount of heat. And, as mentioned above, the refreezing of an increasing amount of reflux liquid may in some cases cause the column to become plugged. The optimum amount of liquid refluxed is that necessary to transfer sufficient heat to the crystals to raise their temperature to their melting point and cause them to melt as they enter the melting zone.

Broadly speaking the invention resides in a process for the purification of crystals, and an apparatus, where the crystals to be purified are fed to two purification columns of the type described, alternately, and a portion of the melt from the column being fed is passed to the other of said columns (not being fed) as reflux.

An object of the invention is to provide an improved process for the separation of multi-component mixtures by fractional crystallization. Another object of the invention is to provide an improved apparatus for separating the components of a multi-component mixture by fractional crystallization. Still another object of the invention is to provide an improved process for the purification of crystals. Yet another object of the invention is to provide an improved process for the purification of crystals wherein better heat distribution is obtained. Still another object of the invention is to provide apparatus for carrying out the method of the invention capable of higher throughput rates and ease of operation. Other aspects, objects and advantages of the invention will be apparent to those skilled in the art upon reading this disclosure.

Thus, according to the invention there is provided, in a process wherein crystals are purified, which process comprises, passing crystals through a filtration section and a reflux section into a melting section of a purification zone, melting crystals in said melting section, withdrawing a portion of the resulting melt, and passing another portion of said melt into said reflux section in a direction countercurrent to the movement of crystals therethrough, the improvement which comprises: alternately passing a first stream of said crystals through a first purification zone and then passing a second stream of said crystals through a second purification zone; passing melt from the melting section of said first purification zone into the reflux section of said second purification zone while crystals are being moved through said first purification zone; and passing melt from the melting section of said second purification zone into the reflux section of said first purification zone while crystals are being moved through said second purification zone.

Further according to the invention there is provided an apparatus for the separation and purification of crystals which comprises, in combination: a pair of crystal purification columns; each of said columns having a liquid withdrawal section, a reflux section, and, a crystal melting section at one end thereof; said columns being interconnected at their melting sections; means for introducing crystals alternately into each of said columns; means for controlling the withdrawal of liquid from each of said liquid withdrawal sections; and means for withdrawing melt as a purified product.

It is to be noted that two purification columns are employed in co-ordinated but out of phase relationship (alternately). The columns are employed in such a manner that the crystal mass in each column is moved therethrough by the hydraulic force applied to the feed, and melt from one column is used to reflux the other column, and vice versa, the flow of feed being supplied to the said columns continuously but alternately to each individual column.

It is also to be noted that the hydraulic force applied to the feed also serves to move melt from one column to the other. Thus, an intermittent countercurrent flow of reflux liquid, with respect to the direction of crystal flow, is accomplished by cyclically increasing the fluid pressure, first at the inlet end of one of said purification columns, and then at the inlet end of the other of said purification columns. In other words, the crystals in said purification columns are subjected to an intermittent back-pressure alternately to the described movement of said crystals.

The method of the invention provides numerous advantages over the methods of the prior art. For example, by employing two columns, continuous operation can be maintained, i. e., feed can be continuously introduced, and product continuously withdrawn at high throughput rates with improved stability and ease of operation. Another important advantage of the invention is the improved heat distribution obtained as a result of my method of supplying reflux to the purification column. The importance of this improved heat distribution will be more fully realized from the discussion given hereinafter.

Several forms of apparatus can be employed to carry out the method of my invention. In one embodiment of the apparatus two purification columns are placed vertically side by side and the bottoms of the two columns are joined together by a U-tube. In another embodiment of the apparatus two purification columns are placed along the same axis and their melting sections joined together. Various other embodiments of apparatus suitable for carrying out the method of the invention will be apparent to those skilled in the art after reading this disclosure.

Figure 2:
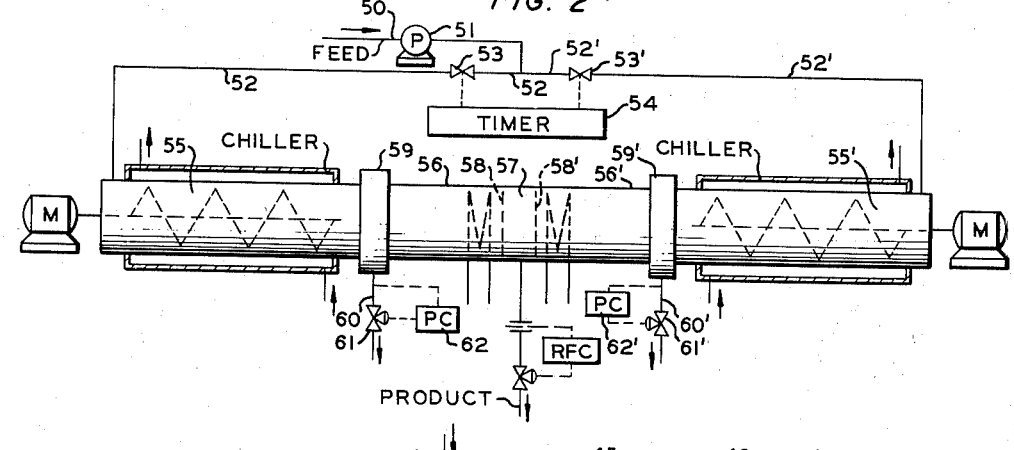
Figure 2 illustrates diagrammatically a second embodiment of the apparatus in which two purification columns are placed along the same axis and are joined at their melting sections to form a common melt chamber between said melting sections.

Referring now to the drawing the invention will be more fully explained. In said drawings much conventional apparatus, such as pumps, valves, heat exchangers, regulators, etc., and the like are not shown but the inclusion of such is within the scope of the invention. In the drawings like reference numerals are employed to denote like pieces of apparatus. The apparatus of Figure 1 comprises a conduit 10 and a pump 11 for the introduction of the mixture, which is to be separated into its components, into the system. Said pump 11 discharges into a three-way valve 12 of known construction. Extending from said valve is a first conduit 13 connected to chilling means 14 and a second conduit 13' connected to chilling means 14'. Said chilling means 14 and 14' each comprise a shell 17 surrounded by cooling jacket 18 having an inlet 19 and an outlet 20 for the circulation of refrigerant. Positioned within each of said shells 17 is an agitating or scraping means 21 which is designed to prevent the accumulation of solid material on the heat exchange surface. Scrapers 21 are suitably constructed of strips of metal. They can be fabricated in the form of a helix, as indicated in the drawing, or can be straight. Any suitable number of scrapers 21 can be employed. Said scrapers 21 are each attached to a shaft 22 axially positioned within shell 17 and operatively connected to motors 23 for rotating said scrapers. Any other suitable source of power for rotating said scrapers can be employed. Each shaft 22 is suitably sealed in the end member of shell 17 by means of a packing gland of any desired type known in the art.

Chillers 14 and 14' are in open communication with one end of purification columns 24 and 24' respectively. Positioned in the upper portion of each said purification columns is a filtration section comprised of two filters 25, 26, and 25', 26'. The filtration means employed in said filtration sections can be any suitable filtering medium known in the art. For example, it can comprise a metallic screen, a sintered perforate metal member or a perforate metal member supporting a filter cloth. In any event, it is desirable that the filtering member be positioned integrally with the wall of the purification column 24 or 24' as the case may be. As herein illustrated said filtering means comprises perforations in the wall of the column. As mentioned a screen can be placed over said perforations if desired or necessary. Surrounding each of the filter mediums is an external shell provided with an outlet conduit. The uppermost of the described filters is usually employed for the removal of mother liquor as hereinafter described. Said mother liquor is withdrawn through conduit 27 or 27' provided with motor valves 28 and 28' controlled by pressure controllers 29 and 29' respectively. The lowermost of said filters 26 or 26' is usually employed for the removal of displaced liquid which has adhered to the crystals after passing through the filtration section. Said displaced liquid is displaced by reflux introduced as described further hereinafter, and is removed through conduits 49 or 49', which are connected to three way valve 30, and is passed through conduit 31 to storage or other use. Valve 70 in conduit 31, controlled by pressure controller 71, can be set to hold a predetermined back pressure on said conduit.

Positioned within the lower portion of crystal purification columns 24 and 24' are heating means 33 and 33' respectively. Said heating means 33 and 33' can be in the form of an electrical heater, or a heat transfer coil as illustrated, through which a suitably heated fluid is pumped. Positioned below each of said heating means are screens 34 and 34' respectively. Said purification columns 24 and 24' are interconnected at their lower ends by conduit 35 which forms a common melt chamber 38 for receiving melt from the melting section of each of said purification columns. Conduit means 36 having a valve 37 therein is provided for withdrawing melt from said melting chamber 38. Valve 37 is preferably a motor type valve which is controlled by rate of flow controller 48.

The movements of three way valves 12 and 30 are synchronized by means of a mechanical linkage which comprises bar member 39, held in a downward position by means of spring 40 when solenoid 41 is not energized, and arms 42 and 43 operatively connected to said valves 12 and 30 respectively. Electrical current to solenoid 41 is supplied from a source of alternating current 44 through electrical lead 45. Electrical lead 45 contains a timer switch 46 of known construction which can be set to actuate said solenoid at a predetermined desired frequency. It is to be understood that it is not intended to limit the present invention to the specific control means described, for other means, such as rotary valves, etc., can be employed which come within the scope and spirit of the invention.

The apparatus of Figure 2 comprises a feed conduit 50 and feed pump 51 which discharges into conduits 52 and 52', having valves 53 and 53' therein which are controlled by means of time cycle controller 54. Time cycle controller 54 can be any well-known type available commercially. One type which can be conveniently employed herein comprises a cam shaft rotating in a manner so as to open valves 53 and 53' alternately. A cam shaft type cycle controller is conveniently employed when valves 53 and 53' are "needle type" valves and are directly actuated by said cam shaft similarly as in an automobile engine. Time cycle controller 54 can also be a timer switch which alternately actuates solenoids (not shown) which can be employed to actuate said valves 53 and 53'. Conduits 52 and 52' are connected to chillers 55 and 55' respectively. Said chillers 55 and 55' are of the same type as chillers 14 and 14' of Figure 1 and will not be described further here. Said chillers 55 and 55' are in open communication with crystal purification columns 56 and 56' respectively. Said cyrstal purification columns are joined at their melting sections to form a common melt chamber 57 which is defined by screens 58 and 58'. Filters 59 and 59' are provided in the upstream portions of purification columns 56 and 56' respectively. Said filters are of the same type and construction as filters 25 and 26 in the apparatus of Figure 1. It will be noted that in the apparatus of Figure 2 only one filter is provided in each purification column. Said filtering section is employed for the removal of both mother liquor which adheres to the crystals and also displaced liquid. Filters 59 and 59' are provided with outlet conduits 60 and 60' respectively, having valves 61 and 61' therein to control the rate of withdrawal through said filters. Valves 61 and 61' can be synchronized with 53 and 53' by operatively connecting same to timer cycle means 54 as will be understood by those skilled in the art in view of the discussion herein.

Figure 1:
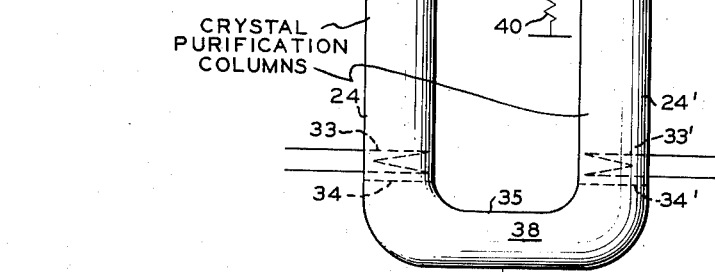
Figure 1 illustrates diagrammatically one embodiment of the apparatus in which two purification columns are placed vertically side by side and the bottoms of the two columns are joined together by a U tube to form a common melt chamber.

The angle of the chillers with respect to the purification columns can be varied over a wide range as is evident from a comparison of Figure 1 and 2. In Figure 1 said chiller is positioned at an angle of about 90° with respect to the purification columns, whereas in Figure 2 said chiller is positioned in the same horizontal plane as the purification columns. Said chillers can be placed at any angle.

While the purification columns have been shown in vertical and in horizontal positions they can also be placed in other positions. Also, while said purification columns have been illustrated as being symmetrical in size the invention is not to be so limited. Purification columns of different sizes, and chillers and other equipment sized commensurate with the size of the different sized columns, can be employed. In such instances suitable adjustments in the feed rates to the different sized columns can be effected by means of the cycle timing equipment as will be understood by those skilled in the art.

The screens, 34 and 34' in Figure 1, 58 and 58' in Figure 2, have been illustrated as below or downstream from the heating elements. This is a preferred position for said screens. However, said screens can also be placed upstream of said heating elements. Or, for that matter, said screens can be eliminated entirely and a grid type heating element can serve as both the heating element and as the screen.

While in both Figure 1 and Figure 2, chillers 14, 14', 55 and 55' have been illustrated as being positioned downstream of the distribution means, i. e., three-way valve 12 in Figure 1 and valves 53 and 53' in Figure 2, it is within the scope of the invention to place said chillers upstream of said distribution devices so that the flow of slurry to the purification columns is controlled directly. However, it is usually preferable to place the flow distribution device in the feed line at a point upstream from that at which crystals first begin to form.

In operation of the apparatus of Figure 1 a feed mixture comprising 2 or more components, at least one of which is separable from said mixture by fractional crystallization, enters the appartus through conduit 10 and is forced by means of pump 11 through three-way valve 12 into either conduit 13 or conduit 13', depending upon the position of said three-way valve 12. As illustrated, valve 12 is open to discharge into conduit 13. Said feed mixture will therefore be passed into chiller 14 wherein its temperature is lowered sufficiently to cause crystallization of the component which it is desired to separate. The slurry formed in chiller 14 is then introduced into the upper end of crystal purification column 24. Excess mother liquid in said slurry is removed through filter 25 by means of conduit 27 and valve 28. Said mother liquor can be passed to storage or other use as desired. The resulting crystal mass is forced toward the melting section of purification column 24 by means of the hydraulic force applied by said pump 11. As the crystal mass approaches heater 33 in said melting section the crystals are melted, and flow into melt chamber 38. It will be remembered that three-way valve 12 can be switched so as to introduce the feed mixture into conduits 13 and 13' alternately. When three-way valve 12 is opened so as to introduce feed into conduit 13' that portion of the feed which was introduced into conduit 13 is "locked in." The portion of the feed introduced into conduit 13' travels through chiller 14' wherein its temperature is lowered sufficiently to cause crystallization as in chiller 14 and the resulting slurry of crystal is passed into the upper end of purification column 24'. Excess mother liquid is removed from said slurry by means of filter 25'. The resulting crystal mass is propelled through crystal purification column 24' in the same manner as that described for crystal purification column 24. As said crystal mass approaches heater 33' said crystals are melted and the resulting melt flows into melt chamber 38.

The movement of crystal slurry through purification columns 24 and 24' with the withdrawal of excess mother liquor through filters 25 and 25' causes a dense mass of crystals to be formed in said columns because screens 34 retain the crystals but permit melt to flow into melt chamber 38. Thus, with the system now ready for continuous alternating operation further introduction of feed mixture into conduit 13 will cause melt to flow into the reflux section of crsytal purification column 24' and thereby displace occluded impurities from the crystals therein. During the time that said feed mixture is being introduced into conduit 13 and progressing through purification column 24 said displaced liquid from column 24' is withdrawn through conduit 49' and three-way valve 30. When three-way valve 12 switches so that said feed mixture is introduced again into column 24', melt will be displaced from melt chamber 38 into the reflux section of column 24 and displace occluded impurities from the crystals therein. Said displaced impurities from the crystals in column 24 are removed through conduit 49 and three-way valve 30, the position of which, as previously explained, is synchronized with the position of three-way valve 12. Thus, the cycle is repeated with three-way valve 12 alternately introducing feed into conduit 13 and conduit 13'. Excess melt is withdrawn from melt chamber 38 through conduit 36.

Displaced occluded impurities removed through filters 26 and 26' and conduits 49 and 49' can, depending upon the composition, be recycled through conduit 31 to conduit 10 for return to the system or withdrawn through conduit 31 for storage or used as desired. When the displaced liquid has a higher concentration of the component being separated than the original feed mixture, it is advantageous to recycle said liquid to conduit 10.

The operation of the apparatus of Figure 2 is similar to the operation of that described in Figure 1. The cycle timer means 54 controls the opening and closing of valves 53 and 53' so that feed from conduit 50 and pump 51 is alternately introduced into conduits 52 and 52'. Said feed is passed through chillers 55 and 55' and chilled to form a slurry of crystals. As the crystal slurry passes filters 59 and 59' excess mother liquor is withdrawn through conduits 60 and 60' respectively. The operation of valves 61 and 61' is controlled by pressure controller means 62 and 62' respectively. Melt from melt chamber 57 is forced into the reflux section of column 56 when valve 53' is open, and melt from said melt chamber 57 is forced into the reflux section of column 56' when valve 53 is open, in the same manner as described in connection with Figure 1.

Three-way valves 12 and 30 can be operated so as to switch at any practical desired frequency. However, it is preferred that said valve switch at a frequency within the range of 1 to 200 times per minute, more preferably in the range of 20 to 30 times per minute. Thus, when said valve is switching or alternating positions at 20-30 times per minute, the frequency of the alternation of the feed mixture between columns 24 and 24' will be 20-30 times per minute. Similarly, cycle timing means 54 can be set to open and close valves 53 and 53' at frequencies within the same range as that given for three-way valves 12 and 30. Thus a rapidly pulsating back-pressure can be supplied to the crystals in each of the purification columns.

The rate of mother liquor removal from filters 25, 25', 59 and 59' can be controlled by any suitable means but is illustrated as being controlled by pressure. The back pressure maintained on said filters will be maintained somewhat below the feed pressure. For example, if the feed pressure is in the order of 100 lbs. p. s. i. g. the back pressure on the mother liquor valves will be set at about 40 to 50 p. s. i. g. As previously mentioned the removal of the displaced occluded impurities through filters 26 and 26' is controlled by means of three-way valve 30, the rotation of which is synchronized with the rotation of valve 12.

The rate of product withdrawal is usually controlled by means of a rate of flow controller as illustrated and is usually controlled relative to the feed rate so as to hold a predetermined back pressure on the purification columns. If desired, however, rate of flow controllers 48 can be replaced with a pressure controller instrument.

It is often desirable to control the relative proportions of solid and liquid in the feed which is introduced into the purification column. It is generally desired that this proportion be such that the mixture has sufficient of the properties of a liquid or slurry to allow transfer of the mixture by pumping. The optimum ratio of solids to liquid depends on the particular materials to be separated, on crystal size, and on other factors and can readily be determined in any particular case by routine experimentation. As a general rule, the solids content of the mixture fed from the chiller into the purification columns will be within the range of 20 to 50 weight percent, and preferably 30 to 40 weight percent. However, solids contents outside the stated ranges can be used.

While this invention is particularly applicable to systems in which the solidification point of the desired pure component is considerably higher than the temperature to which the component is cooled in the liquid mixture to form crystals thereof, this procedure can be advantageously utilized in practically any system to which fractional crystallization is applicable so as to increase the efficiency of the process. This invention is applicable to separations in many multi-component systems, the components of which have practically the same boiling point and are, therefore, difficult to separate by fractional distillation, or to mixtures which have diverse boiling points but which form azeotropes or are heat sensitive. The effective separation of components of such mixtures can be made from systems where the concentration of one component is relatively high, or where the concentrations of the components are about equal. One particular advantageous application of the process lies in the purification of a component of, say 15 to 25 percent purity, so as to effect a purity upwards of 98 percent. In order to illustrate some of the systems to which the invention is applicable, the following compounds are grouped with respect to their boiling points.

|  | B. P., ° C. | F. P., ° C. |
|---|---|---|
| Group A: | | |
| Benzene | 80 | 5.5 |
| n-Hexane | 69 | −94 |
| n-Heptane | 98.52 | −90.5 |
| Carbon Tetrachloride | 77 | −22.8 |
| Acrylonitrile | 79 | −82 |
| Ethyl Alcohol | 78.5 | −117.3 |
| 2,2-Dimethylpentane | 79 | −125 |
| 2,3-Dimethylpentane | 86 | |
| Methyl ethyl ketone | 79.6 | −86.4 |
| Methylpropionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |
| Group C: | | |
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| CS$_2$ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | −25 |
| Para-cymene | 176.0 | −73.5 |
| Group H: | | |
| Dimethyl phthalate | 282 | 5.5 |
| Dimethyl isophthalate | 124 (12 mm.) | 67 |
| Dimethyl terephthalate | 288 | 140.6 |
| Group I: | | |
| Ortho-nitrotoluene | 222.3 | α−10.6 / β−4.1 |
| Meta-nitrotoluene | 231 | 15.5 |
| Para-nitrotoluene | 238 | 51.3 |

Systems consisting of any combination of two or more of the components within any one of the groups can be separated by the process of the invention, as well as systems made up of components selected from different groups; for example, benzene can be separated from a benzene, n-hexane or n-heptane system in which the benzene is present in an amount greater than the eutectic concentration. In the same manner, para-xylene can be readily separated from a mixture of para- and meta-xylenes or from para-, meta-, and ortho-xylenes. Benzene can also be separated from a mixture of toluene and/or aniline. Multi-component systems which can be effectively separated so as to recover one or more of the components in substantially pure form include 2,2-dimethyl-pentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes.

This invention can also be utilized to purify naphthalene, hydroquinone (1,4-benzendiol), para-cresol, para-dichlorobenzene, and such materials as high melting waxes, fatty acids, and high molecular normal paraffins.

The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is warmed to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

While the invention has been described in terms of purifying crystals, it is not necessarily so limited. The invention can be employed for the purification of any solid which can be melted and a portion of the melt employed as reflux liquid as described in connection with the purification of crystals.

The following example will serve to further illustrate the invention.

Example

A feed stream comprising 60 wt. percent p-xylene (the remainder being o- and m-xylenes and ethyl benzene) is supplied to the apparatus of Figure 1 at a temperature of 100° F. The chillers are operated at an outlet temperature of 0° F., producing a slurry containing about 30 percent para-xylene crystals. The timer is set to cause the feed to be switched to alternate chillers at a rate of 25 cycles per minute. Mother liquor having p-xylene content of 43 weight percent is withdrawn from filters 25 and 25', and a product stream containing 98 wt. percent p-xylene is produced at a rate of 30 lbs. per hour.

As will be evident to those skilled in the art in view of the above discussion, various modifications of the invention can be made without departing from the spirit or scope of the invention.

I claim:

1. In a process wherein crystals are purified, which process comprises, passing crystals through a filtration section and a reflux section into a melting section of a purification zone, melting crystals in said melting section, withdrawing a portion of the resulting melt, and passing another portion of said melt into said reflux section in a direction countercurrent to the movement of crystals therethrough; the improvement which comprises: alternately passing a first stream of said crystals through a first purification zone and then passing a second stream of crystals through a second purification zone; passing melt from the melting section of said first purification zone into the reflux section of said second purification zone while crystals are being moved through said first purification zone; and passing melt from the melting section of said second purification zone into the reflux section of said first purification zone while crystals are being moved through said second purification zone.

2. In a crystal purification process in which crystals and adhering mother liquor are passed through a liquid removal section wherein mother liquor is removed, a reflux section, and a melting section of a crystal purification column, said crystals are melted in said melting section, a portion of the resulting melt is withdrawn from the column as product of the process and another portion is forced countercurrently into said reflux section, the method of operating a pair of such purification columns joined together at their melting sections, which comprises: cyclically applying fluid pressure, first at the inlet end of one of said purification columns, and then at the inlet end of the other of said purification columns so as to subject said crystals in said purification columns to an intermittent back-pressure alternately to the described movement of said crystals through said columns.

3. The process of claim 2 wherein said back-pressure is applied to each of said columns at a frequency in the range of 1 to 200 times per minute.

4. The process of claim 2 wherein said back-pressure is applied to each of said columns at a frequency in the range of 20 to 30 times per minute.

5. In a process in which crystals are purified by moving said crystals through a filtration section and a reflux section into a melting section of a purification zone, melting crystals in said melting section, withdrawing a portion of the resulting melt, and passing another portion of said melt into said reflux section in a direction countercurrent to the direction of crystal movement therethrough, the method of operating a pair of such purification zones having one common melt collection chamber, which comprises: cyclically moving crystals, by application of hydraulic force first at the inlet end of one of said purification zones and then at the inlet end of the other of said purification zones, through first one of said purification zones and then through the other of said purification zones in alternate relationship; and forcing melt from said common melt chamber into the reflux section of said first purification zone and then into the reflux section of said other purification zone in alternate relationship opposite to the alternate movement of crystals through said purification zones.

6. In a process which comprises moving a stream of crystals, together with adhering liquid, through a liquid removal section, then through a reflux section and finally through a melting section, of a purification zone, withdrawing liquid in said liquid removal section, melting at least part of said crystals in said melting section, removing part of the melt from said melting section as product of the process and refluxing crystals in said reflux section countercurrently with melt from said melt section, the method of operating a pair of such purification zones having a common melt chamber in coordinated but out of phase relationship (alternately) which comprises: moving a first stream of said crystals through a first such purification zone for a predetermined period of time; terminating movement of crystals in said first purification zone; moving a second stream of said crystals through a second such purification zone for a predetermined period of time; forcing melt from said common melt chamber into the reflux section of said second purification zone during the period of crystal movement in said first purification zone; and forcing melt from said common melting section into the reflux section of said first purification zone during the period of crystal movement in said second purification zone.

7. A process for the separation of crystals from adhering mother liquor and the purification of said crystals, which process comprises: alternately introducing, a first mass of said crystals into a first purification zone and a second mass of said crystals into a second purification zone; in each of said purification zones moving said crystals by application of hydraulic force through a liquid removal section wherein liquid is removed, a reflux section wherein at least a portion of said crystals are contacted countercurrently with a reflux liquid, and then into a melting section wherein said crystals are melted; during the period said first mass of crystals is being moved thereinto, forcing a portion of the melt from the melting section of said first purification zone through a melt collection section common to both of said purification zones and into the reflux section of said second purification zone as reflux liquid and withdrawing the remainder of said melt as product of the process; and during the period said second mass of crystals is being moved thereinto, forcing a portion of the melt from the melting section of said second purification zone through said common melt collection section and into the reflux section of said first purification zone as reflux liquid and withdrawing the remainder of said last named melt as product of the process.

8. In a process; wherein a body of crystals is moved through a liquid removal zone wherein liquid is removed; a reflux zone wherein said crystals are contacted countercurrently with a reflux liquid, and into a crystal melting zone wherein said crystals are melted to form a melt; the improvement which comprises the cycle of steps of: moving a first body of said crystals through a first liquid removal zone, a first reflux zone and into a first melting zone wherein said first body of crystals is melted to form a first melt; passing said first melt into a melt collection zone; withdrawing a portion of said first melt as product of the process; terminating the movement of said first body of crystals; initiating movement of a second body of said crystals through a second liquid removal zone, a second reflux zone and a second melting zone wherein said second body of crystals is melted to form a second melt; passing said second melt into said melt collection zone; withdrawing a portion of said second melt as product of the process; passing the remainder of said first melt, not withdrawn as product of the process, to said second reflux zone as reflux liquid; and passing the remainder of said second melt, not withdrawn as product of the process, to said first reflux zone as reflux liquid therein.

9. A cyclic process for the separation and purification of a crystallizable component of a liquid multi-component mixture which comprises the cycle of steps of: introducing a feed stream of said mixture into a first chilling zone and therein chilling said mixture to form a first mass of crystals of said crystallizable component; forcing said first mass of crystals by application of feed hydraulic pressure into and through a first purification zone, in countercurrent contact with a reflux liquid produced as subsequently described, and toward a first melting zone; forcing said first mass of crystals into said first melting zone and therein melting same to form a first melt; forcing a portion of said first melt through a melt collection zone and into a second purification zone to countercurrently reflux a second mass of crystals of said crystallizable component produced as subsequently described; withdrawing the remainder of said first melt as product of the process; terminating the introduction of said mixture into said first chilling zone; initiating introduction of said mixture into a second chilling zone and therein chilling said mixture to form said second mass of crystals of said crystallizable component; forcing said second mass of crystals by application of feed hydraulic pressure through said second purification zone in countercurrent contact with said portion of said first melt; forcing said second mass of crystals into a second melting zone and therein melting same to form a second melt; forcing a portion of said second melt through said melt collection zone and into said first purification zone as said reflux liquid; withdrawing the remainder of said second melt as product of the process; terminating the introduction of said mixture into said second chilling zone; and repeating said cycle.

10. A process for the separation and purification of a crystallizable component of a liquid multi-component mixture which comprises the cycle of: introducing a feed stream of said mixture into a first chilling zone and therein chilling said mixture to form a first slurry of crystals of said crystallizable component; forcing said first slurry by application of feed hydraulic pressure into and through a first purification zone wherein mother liquor is removed from said first slurry in a filtration section and then toward a first melting section in countercurrent contact with a reflux liquid produced as subsequently described; forcing the crystals of said first slurry into said first melting section and therein melting same to form a first melt; forcing a portion of said first melt through a melt collection zone and into a second purification zone to countercurrently contact crystals of a second slurry produced as subsequently described; withdrawing another portion of said first melt as product of the process; terminating the introduction of said mixture into said first chilling zone; initiating introduction of said mixture into a second chilling zone and therein chilling said mixture to form said second slurry of crystals of said crystallizable component; forcing said second slurry by application of feed hydraulic pressure into and through said second purification zone wherein mother liquor is removed from said second slurry in a filtration section and then toward a second melting section in countercurrent contact with said portion of melt from said first melting zone; forcing the crystals of said second slurry into said second melting section and therein melting same to form a second melt; forcing a portion of said second melt through said melt collection section into said first purification zone as said reflux liquid; withdrawing another portion of said second melt as product of the process; and repeating said cycle.

11. Apparatus for the separation and purification of crystals which comprises, in combination: a pair of crystal purification columns; each of said columns having a liquid withdrawal section, a refluxing section, and, a crystal melting section at one end thereof; said columns being joined at their melting sections to form a common melt collection chamber; means for cyclically and alternately moving crystals through each of said columns into said melt collection chamber and forcing melt from said chamber into the refluxing section of each column alternately to crystal movement therein; means for controlling the withdrawal of liquid from each of said liquid withdrawal sections; and means for withdrawing product melt from said melt chamber.

12. Apparatus for the separation and purification of a crystallizable component of a liquid multi-component mixture which comprises, in combination: a first crystal purification column and a second crystal purification column; each of said columns having a liquid withdrawal section, a refluxing section, and, a crystal melting section at one end thereof; said columns being joined at their melting sections to form a common melt chamber; a first chiller means operatively communicating with the other end of said first column; a second chiller means operatively communicating with the other end of said second column; pump means and conduit means for introducing said mixture into a first valve means adapted to cyclically and alternately introduce said mixture into a first inlet conduit connected to said first chiller means and then into a second inlet conduit connected to said second chiller means; a second valve means adapted to permit cyclical and alternate withdrawal of liquid from the refluxing section of said first column and then from the refluxing section of said second column; means for synchronizing the operation of said second valve means with the operation of said first valve means so as to permit the withdrawal of liquid from said reflux sections of said columns alternately to the introduction of said mixture into said first and said second chiller means; and means for withdrawing melt from said melt chamber.

13. Apparatus for the separation and purification of crystals which comprises, in combination: a pair of crystal purification columns; each of said columns having a liquid withdrawal section, a reflux section, and a crystal melting section; said columns being inter-connected at their melting sections; means for cyclically and alternately introducing crystals into and moving same through each of said columns and forcing a portion of the melt from the column wherein crystals are being introduced into the column wherein crystals are not being introduced; and means for withdrawing melt from each of said columns.

14. Apparatus for the separation and purification of crystals which comprises, in combination: a pair of elongated crystal purification columns; each of said columns having an open feed end, a filter section in the wall thereof near said open end, a refluxing section downstream from (in the direction of crystals movement) and adjoining said filter section, and a crystal melting section downstream from and adjoining said refluxing section; said columns being connected at their crystal melting sections to form a common melt collection chamber; means for cyclically and alternately moving a slurry of crystals into and through first one and then the other of said columns into said common melt chamber and forcing melt from said melt chamber into the refluxing section of first one and then the other of said columns in alternate relationship opposite to the alternate movement of crystals through said columns; means for controlling the withdrawal of liquid from said filter sections; and means for removing product melt from said melt collection chamber.

15. Apparatus for the separation and purification of a crystallizable component of a liquid multi-component mixture which comprises, in combination; a pair of elongated, pistonless, cylindrical columns having an open feed end and a product removal end; a first filter section in the wall of each column near its open feed end for withdrawing excess mother liquor; a second filter section in the wall of each column downstream from said first filter section (with respect to crystal movement) for withdrawing reflux liquid; heating means in each of said columns providing a crystal melting section downstream from said second filter section (with respect to crystal movement) for withdrawing reflux liquid; heatinng means in each of said columns providing a crystal melting section downstream from said second filter section and adjacent said product removal end; the portion of said columns between said melting section and said second filter section defining a refluxing section; a tubular conduit joining said columns at their product removal ends so as to form a common melt collection chamber; means for withdrawing melt from said melt collection chamber; a pair of jacketed cylindrical chillers each having a feed inlet, a crystal outlet, and scraper means therein for scraping crystals off the wall thereof, each of said chillers being in communication at its delivery end with the open feed end of one of said columns; pump means for cyclically and alternately feeding said mixture into first one and then the other of said chillers and moving resulting crystals through said columns cyclically and alternately by application of feed hydraulic pressure; and valve means for withdrawing reflux liquid from said second filter section in each of said columns cyclically and alternately in alternate relationship opposite to the alternate feeding of said mixture to said chillers.

16. Apparatus for the separation and purification of a crystallizable component of a liquid multi-component mixture which comprises, in combination: a pair of elongated, pistonless, cylindrical columns having an open feed end and a product removal end; a filter section in the wall of each column near its open feed end for withdrawing liquid; heating means in each of said columns providing a crystal melting section downstream (with respect to crystal movement) from said filter section and adjacent said product removal end; the portion of said columns between said melting section and said filter section defining a refluxing section; said columns being joined at their product removal ends to form a common melt collection chamber; means for withdrawing melt from said melt collection chamber; a pair of jacketed cylindrical chillers each having a feed inlet, a crystal outlet, and scraper means therein for scraping crystals off the wall thereof, each of said chillers being in communication at its delivery end with the open feed end of one of said columns; pump means for cyclically and alternately feeding said mixture into first one and then the other of said chillers and moving resulting crystals through said columns cyclically and alternately by application of feed hydraulic pressure; and means for controlling the withdrawal of liquid from the filter sections of said columns.

References Cited in the file of this patent

UNITED STATES PATENTS

| Re. 23,810 | Schmidt | Mar. 30, 1954 |
| 2,679,539 | McKay | May 25, 1954 |
| 2,747,001 | Weedman | May 22, 1956 |